United States Patent
Gillis et al.

(10) Patent No.: US 6,901,883 B2
(45) Date of Patent: Jun. 7, 2005

(54) MULTI-FUNCTION ANIMAL TRAINING TRANSMITTER

(75) Inventors: Greg Gillis, Escondido, CA (US); James Jameson, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 0 days.

(21) Appl. No.: 10/643,809

(22) Filed: Aug. 19, 2003

(65) Prior Publication Data

US 2005/0039700 A1 Feb. 24, 2005

(51) Int. Cl.[7] ............................................. A01K 15/02
(52) U.S. Cl. ...................... 119/712; 119/719; 119/720
(58) Field of Search ..................... 119/712, 719, 720, 119/859, 908

(56) References Cited

U.S. PATENT DOCUMENTS

| | | | |
|---|---|---|---|
| 6,019,066 A * | 2/2000 | Taylor | 119/720 |
| 6,549,133 B2 * | 4/2003 | Duncan et al. | 119/719 |
| 6,598,563 B2 * | 7/2003 | Kim et al. | 119/720 |
| 6,600,422 B2 * | 7/2003 | Barry et al. | 119/720 |
| 2002/0040689 A1 * | 4/2002 | So | 119/720 |
| 2002/0073931 A1 * | 6/2002 | Boesch et al. | 119/719 |

* cited by examiner

*Primary Examiner*—Teri Pham Luu
*Assistant Examiner*—Elizabeth Shaw
(74) *Attorney, Agent, or Firm*—Pitts & Brittian, P.C.

(57) ABSTRACT

An apparatus adapted to implement various animal training techniques using a hand-held transmitter having a keypad that can be reprogrammed. The multi-function transmitter is configurable to train multiple pets using a selected function or to train a single pet using multiple functions.

12 Claims, 10 Drawing Sheets

MULTI-FUNCTION ANIMAL TRAINING TRANSMITTER

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of Invention

This invention pertains to an electronic animal training apparatus that allows a trainer to remotely correct the behavior of animals. More particularly, this invention pertains to a hand-held transmitter used by a trainer having a keypad that can be reprogrammed to be used with a variable number of animals and for various training objectives.

2. Description of the Related Art

Electronic animal training devices are an effective tool for correcting the behavior of animals. Professional trainers widely employ electronic animal training to prepare animals for a task. A common example is the training of sporting dogs to retrieve game. A professional trainer generally performs a variety of training methods and works with a large number of animals on a regular basis. Because of this, trainers are required to utilize more than one electronic training apparatus in performance of their duties.

The necessity of multiple electronic training devices unnecessarily increases the complexity of training. A trainer must maintain a variety of matched transmitter and receiver collar pairs to accomplish different training functions. Even when the products are all supplied by the same manufacturer, there is no assurance that interoperability between the devices was contemplated.

As training progresses, the method employed by the trainer may change to best tailor the training program to the animal. If the change to the training program involves a change in the electronic training apparatus facilitating the training, the trainer must cease training and swap the training device in use. The change may simply involve swapping the transmitter unit for another, but it may also require the receiver unit to be traded out for another that is paired with the new transmitter.

Accordingly, it is desirable to use a transmitter and receiver collar pair where the function of the transmitter can be altered as desired by the trainer. This would eliminate the need for having multiple transmitter and receiver collar pairs available to the trainer.

BRIEF SUMMARY OF THE INVENTION

An apparatus adapted to implement various animal training techniques using a hand-held transmitter having a keypad that can be reprogrammed, or multi-function transmitter, is shown and described. The multi-function transmitter is configurable to train multiple pets using a selected function or to train a single pet using multiple functions.

The circuit includes a processing device that controls the major functions of the multi-function transmitter. The circuit of the present invention further includes a number of other components in communication with the processing device. A power subsystem includes a power source in electrical communication with a power protection circuit, a voltage regulator, and a low power detection circuit. The low power detection circuitry communicates with the processing device to provide indication to the user of the need to replace or charge the power source.

A number of control switches are in electrical communication with the processing device. The training control switches are assigned functions based upon the selected mode, which is selected via a separate button. The multi-function transmitter typically includes another control switch from which unique values can be read thereby allowing the processing device to set a variable characteristic. The processing device communicates information to the operator through at least one indicator. A communication subsystem in communication with the processing device transmits information from the multi-function transmitter to a receiver unit carried by the animal being trained. An amplification and filtering stage provides additional signal processing before transmitting the modulated carrier wave.

The multi-function transmitter of the present invention operates generally as follows. Initially, the multi-function transmitter is initialized. Subsequently, the multi-function transmitter polls for a user input. If the mode control button is pressed, the multi-function transmitter enters a mode selection function. If the mode control button is not active, the system enters a training mode. First, the training mode is initialized. Next, functions are assigned to the upper control button and lower control button based upon the selected mode. When either of the upper control button and lower control button is activated, the function currently associated with the button is processed and a data packet for the training signal is generated. The training signal, including the data packet containing function information, is transmitted. The system then loops looking for continued activity on the control buttons and responds accordingly.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

An apparatus adapted to implement various animal training techniques using a hand-held transmitter having a keypad that can be reprogrammed, or multi-function transmitter, is shown generally at 10 in the figures. The multi-function transmitter is configurable to train multiple pets using a selected function or to train a single pet using multiple functions.

Figure 1:
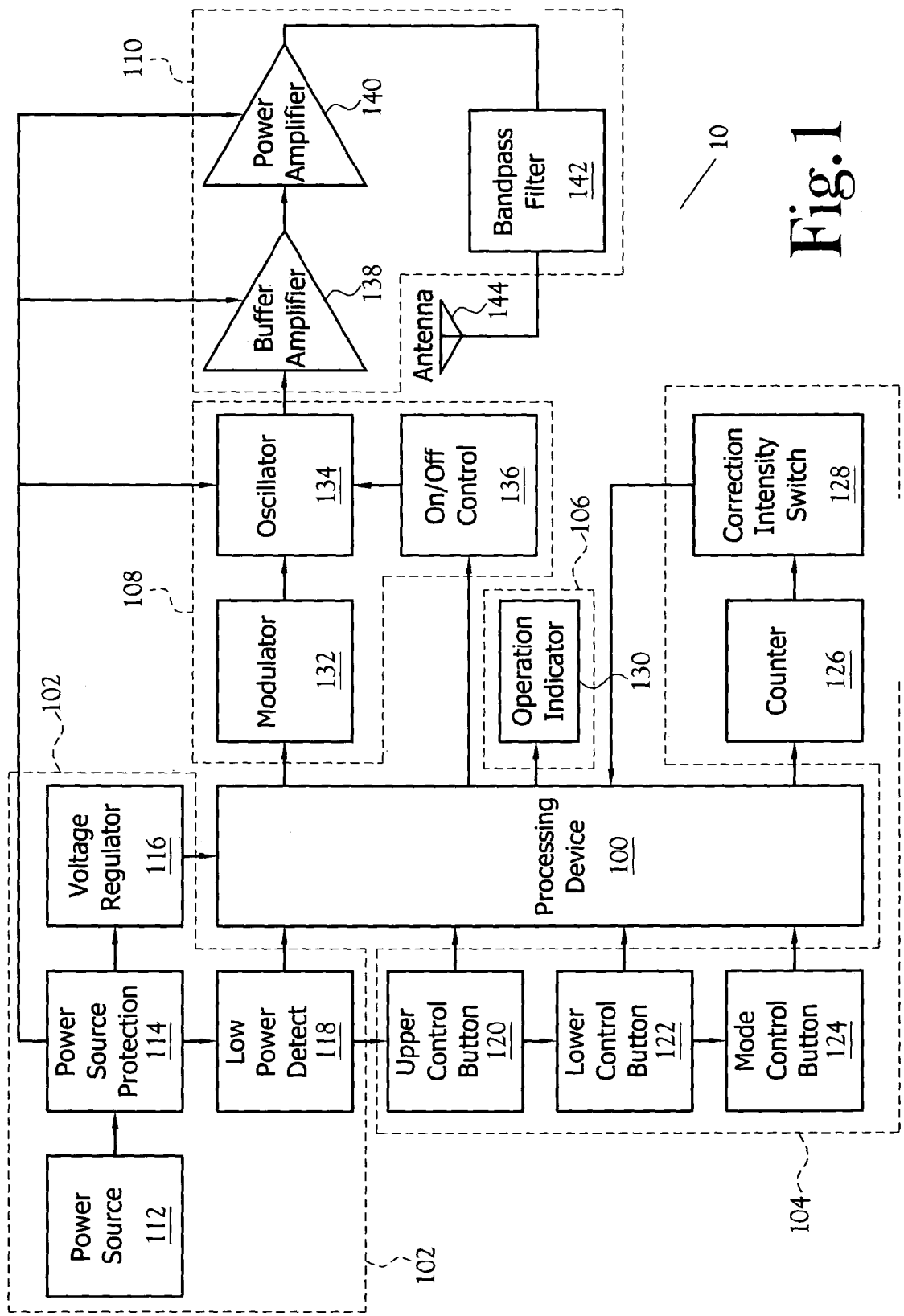
FIG. 1 is a block diagram of a circuit for a multi-function transmitter.

FIG. 1 illustrates a block diagram of one embodiment of a circuit of the present invention. The circuit includes a processing device 100 that controls the major functions of the multi-function transmitter 10. In the illustrated embodiment, the processing device 100 is a microcontroller including electrically erasable programmable read-only memory (EEPROM) and an interrupt on change feature. One microcontroller incorporating the desired features is the PICmicro™ 16CE625 from Microchip Technology, Inc. Those skilled in the art will recognize that other processing devices capable of providing the required control logic can be used without the departing from the scope in spirit of the present invention. The circuit of the present invention further includes a number of other components in communication with the processing device 100. A power subsystem 102 includes a power source 112, such as a battery, in electrical communication with a power protection circuit 114, a voltage regulator 116, and a low power detection circuit 118. The low power detection circuitry 118 communicates with the processing device 100 to provide indication to the user of the need to replace or charge the power source 112.

A number of control switches 104 are in electrical communication with the processing device 100. Shown in FIG. 1 are an upper control button 120, a lower control button 122, a mode control button 124, and a correction intensity switch 128. The switches described herein represent one embodiment of the present invention. However, variations in the type and number of the switches can be made without departing from this scope in spirit of the present invention depending upon the intended objectives of the device. In one embodiment, the upper control button 120, the lower control button 122, and the mode control button 124 are normally open push button type switches and the correction intensity switch 128 is a multi-position rotary switch. A counter 126 provides a number of unique outputs. Each unique counter output drives one input of the multi-position rotary switch. This allows the processing device 100 to read unique values from the correction intensity switch and select a variable characteristic, which is described herein as the desired intensity level for the correction stimulus. Those skilled in the art will recognize that functions other than correction intensity control can be substituted without departing from the scope and spirit of the present invention.

The processing device 100 communicates information to the operator through at least one indicator 130 In one embodiment, the indicator 130 includes a number of light emitting diodes (LEDs), which are flashed to provide such information as the activation of the upper control button 120 or the lower control button 122 and the current mode setting. Those skilled in the art will recognize that more sophisticated indicators can be implemented without departing from the scope in spirit of the present invention. For example multi-segment LEDs or a liquid crystal display can be used to provide easier to interpret or more detailed communication as desired.

A communication subsystem 108 in communication with the processing device 100 transmits information from the multi-function transmitter 10 to a receiver unit carried by the animal being trained. In the illustrated embodiment, the communication subsystem 108 includes a modulator 132, an oscillator 134, and an on/off control 136 in communication with the processing device 100 for generating a modulated carrier frequency containing information about the type of the correction stimulus to be applied by the receiver unit. The present invention operates in the radio frequency band using approved communication frequencies. Radio frequency communications and the appropriate modulation schemes are well known to those skilled in the art.

An amplification and filtering stage 110 provides additional signal processing before transmitting the modulated carrier wave. In the illustrated embodiment, the amplification and filtering stage 110 includes a buffer amplifier 138, a power amplifier 140, and a bandpass filter 142 connected to the broadcast antenna 144. Again, those skilled in the art will recognize that the implementation of the amplification and filtering stage 110 depends upon the design objectives for the device.

The block diagram of FIG. 1 illustrates the major components of the circuit for the multi-function transmitter 10. It is not intended to illustrate basic connections and components, for example, power and ground connections and other standard components, such as pull-up resistors. Those skilled in the art will recognize the need for such wiring and components and will recognize the proper interconnection required to implement the invention described herein without undue experimentation based on the components selected for use.

Figure 2:
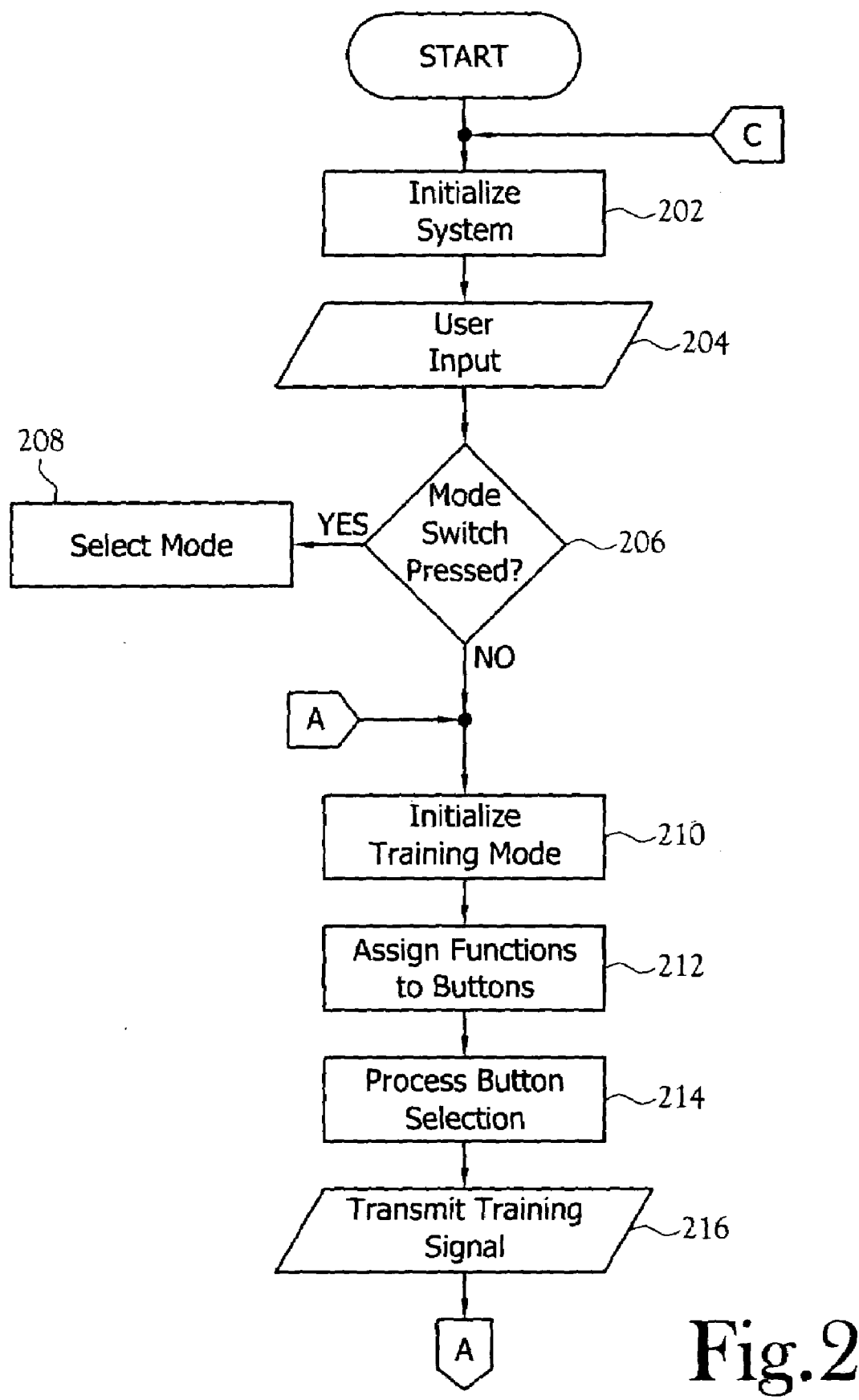
FIG. 2 is a flow diagram of a method for implementing the remote transmitter of FIG. 1.

FIG. 2 is a flow diagram of the method of operating the multi-function transmitter 10 of the present invention. Initially, the multi-function transmitter 10 is initialized 202. Subsequently, the multi-function transmitter 10 polls for a user input 204. If the mode control button 124 is pressed, the multi-function transmitter 10 enters a mode selection function 208. If the mode control button 124 is not active, the system enters a training mode. First, the training mode is initialized 210. Next, functions are assigned to the upper control button 120 and lower control button 122 based upon the selected mode 212. When either of the upper control button 120 and lower control button 122 is activated, the function currently associated with the button is processed and a data packet for the training signal is generated 214. The training signal, including the data packet containing function information, is transmitted, step 216. The system then loops looking for continued activity on the upper control button 120, the lower control button 122, or the mode control button 124 and responds accordingly.

Figure 3:
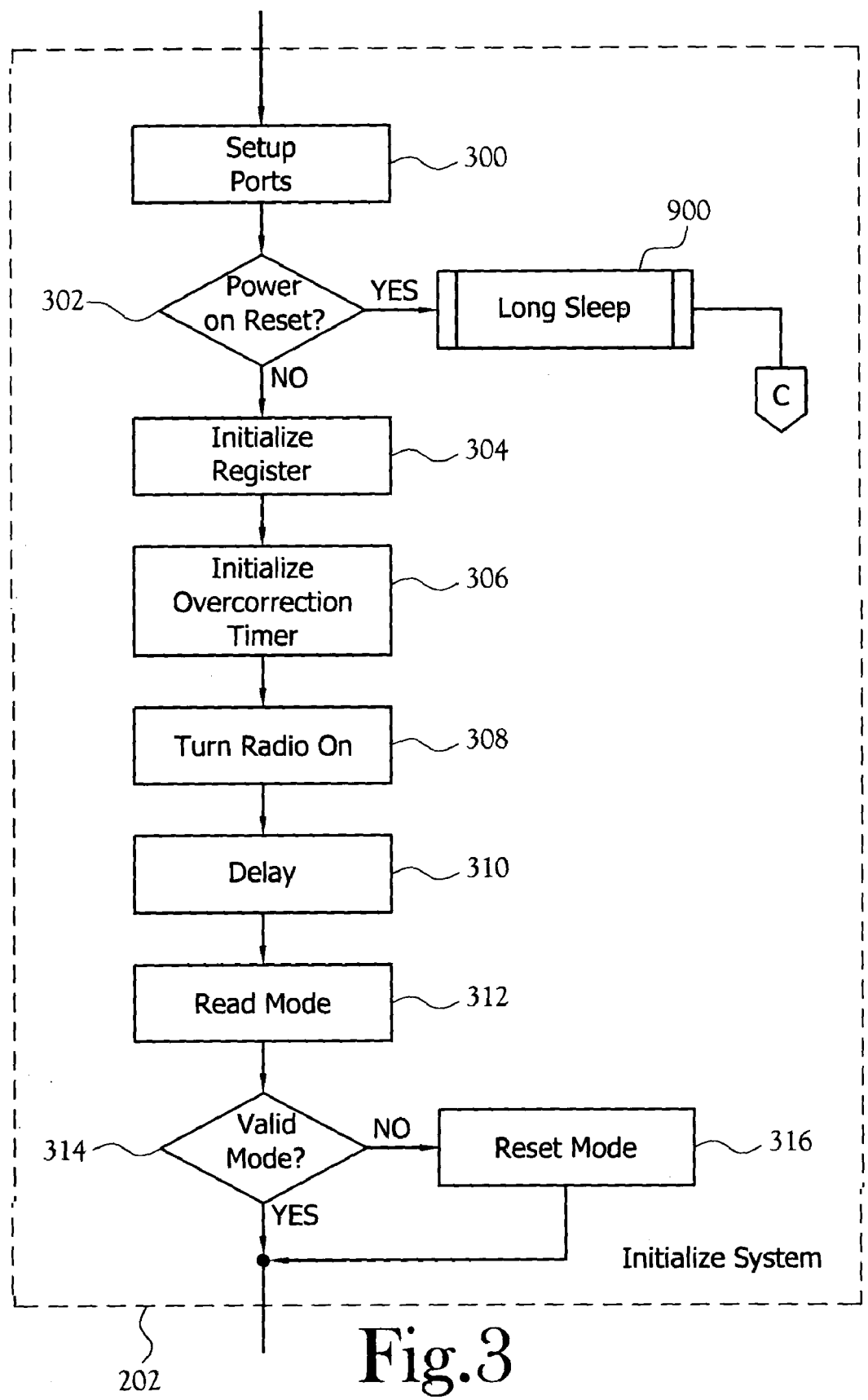
FIG. 3 is a flow diagram illustrating one embodiment of the system initialization function of the multi-function transmitter.

FIG. 3 illustrates the steps involved in initializing the system 202 in greater detail. The multi-function transmitter 10 sets up the systems ports 300. The multi-function transmitter 10 then decides if it is responding to a power-on reset 302. In the case of a power-on reset, the system enters a long sleep 900. If not, the registers are initialized 304 and the overcorrection timer is initialized 306. Next, the radio transmitter is turned on 308. After a delay 310, the current training mode is read 312. The current mode is verified to be a valid mode 314. If the mode is invalid, the training mode is reset to a selected valid mode 316. Once a valid mode is selected, the operation continues looking for user input 204.

Figure 4:
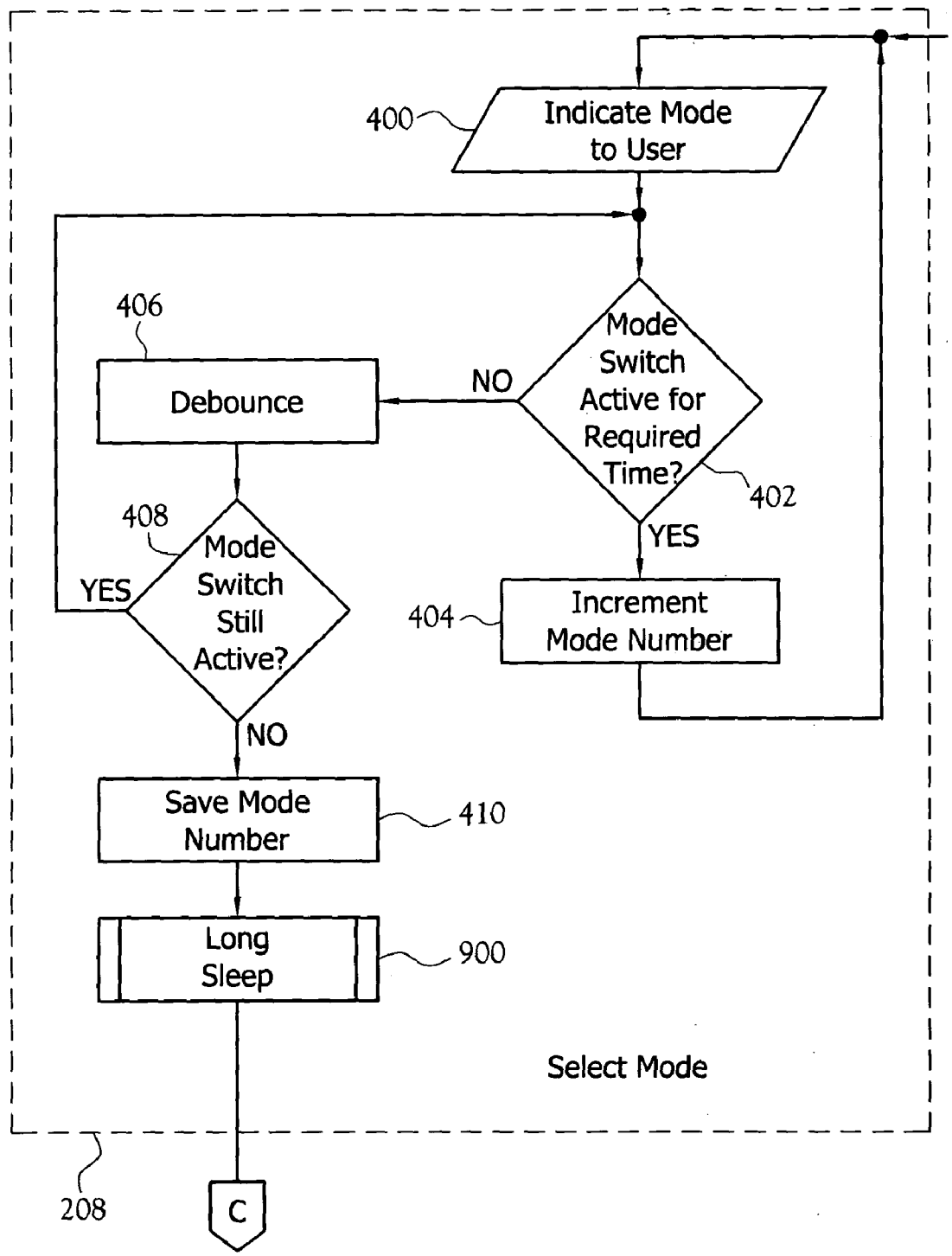
FIG. 4 is a flow diagram illustrating one embodiment of the training mode selection function for the multi-function transmitter.

FIG. 4 illustrates the steps involved in selecting a training mode 208 in greater detail. After the mode control button 124 is activated, the multi-function transmitter 10 indicates the current mode to the user 400. Those skilled in the art will recognize the various methods and structures that can be used to indicate the current mode to the user without departing from the scope and spirit of the present invention. The multi-function transmitter 10 determines whether the mode control button 124 is held for a specified length of time 402. If the required activation time is met, the mode number is incremented 404 and the operation returns to step 400, which indicates the new mode to the user. Should the multi-function transmitter 10 be unable to determine whether the mode control button 124 has been held for the required time, a debounce function 406 is applied to the mode control button 124 and the activation status of the mode control button 124 is checked again 408. If the mode control button 124 remains active, the mode selection cycle is not complete and operation returns to step 402, which again determines the activation time of the mode control button 124. If, in step 408, the mode control button 124 is determined to not be active, then the current mode number is stored 410 and the multi-function transmitter 10 enters a long sleep cycle 900.

Figure 5:
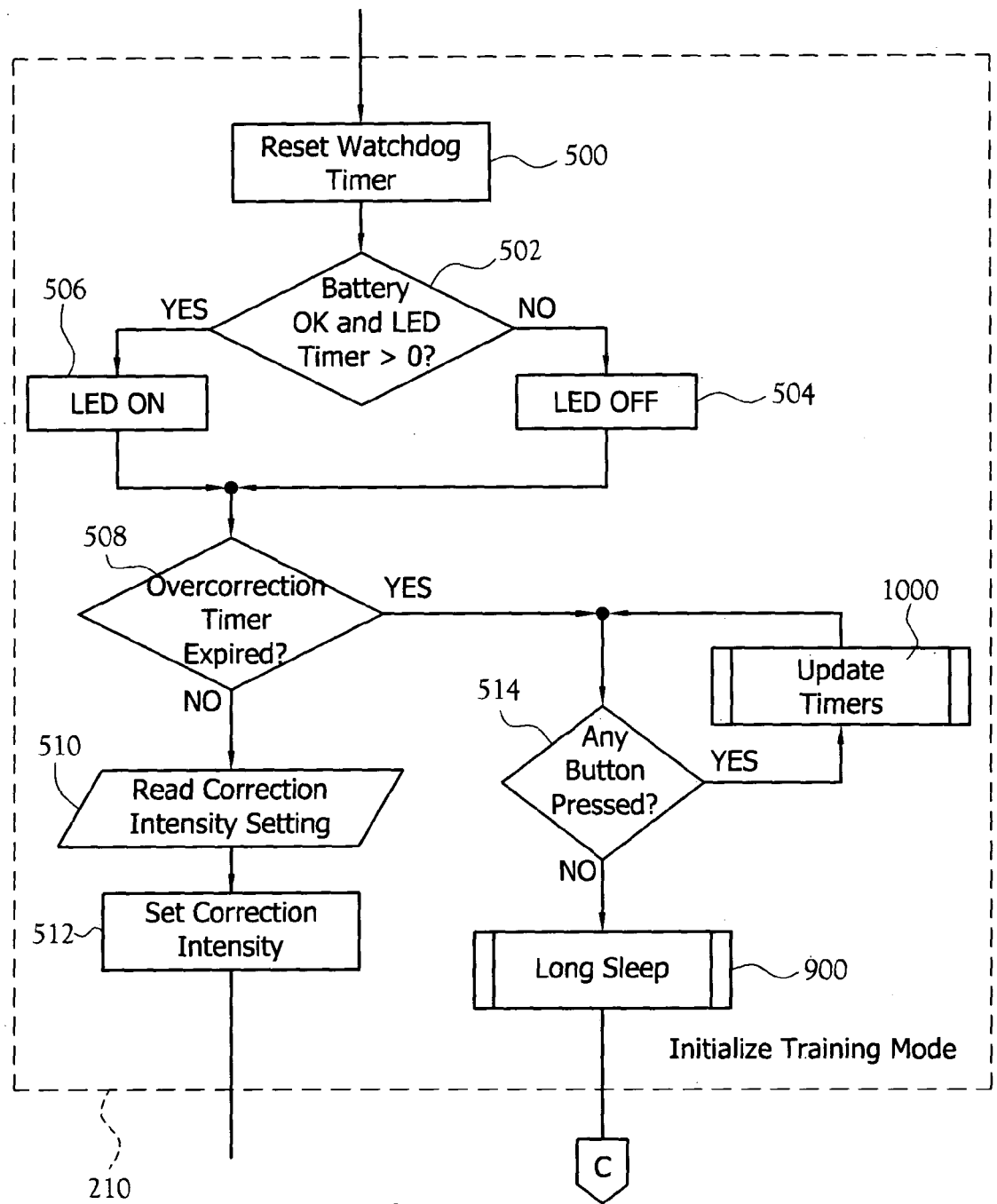
FIG. 5 is a flow diagram illustrating one embodiment the training mode initialization function of the multi-function transmitter.

FIG. 5 illustrates the training mode initialization 210 in greater detail. Following the long sleep cycle 900, the watchdog timer is reset 500. Next, the power source 112 is checked for sufficient voltage to ensure proper operation of the multi-function transmitter 10 and the value of the LED timer is compared to a reference value 502. If the multi-function transmitter 10 is determined to be ready for operation, the operation indicator 130 is activated 506 otherwise the operation indicator 130 is deactivated 504. Next, the multi-function transmitter 10 verifies that the overcorrection timer has not expired 508. If an overcorrection condition is indicated, the multi-function transmitter 10 determines whether any control button 120, 122 is active 514. While the control button 120, 122 remains active, the update timers function 1000 repeats. Once the control button 120, 122 is released, the multi-function transmitter 10 enters the long sleep cycle 900. Following the long sleep 900, the multi-function transmitter 10 reinitializes the system 202. If an overcorrection condition does not exist, the correction intensity setting is read 510 from the correction intensity switch 128 128. The correction intensity is then stored for later use 512.

Figure 6:
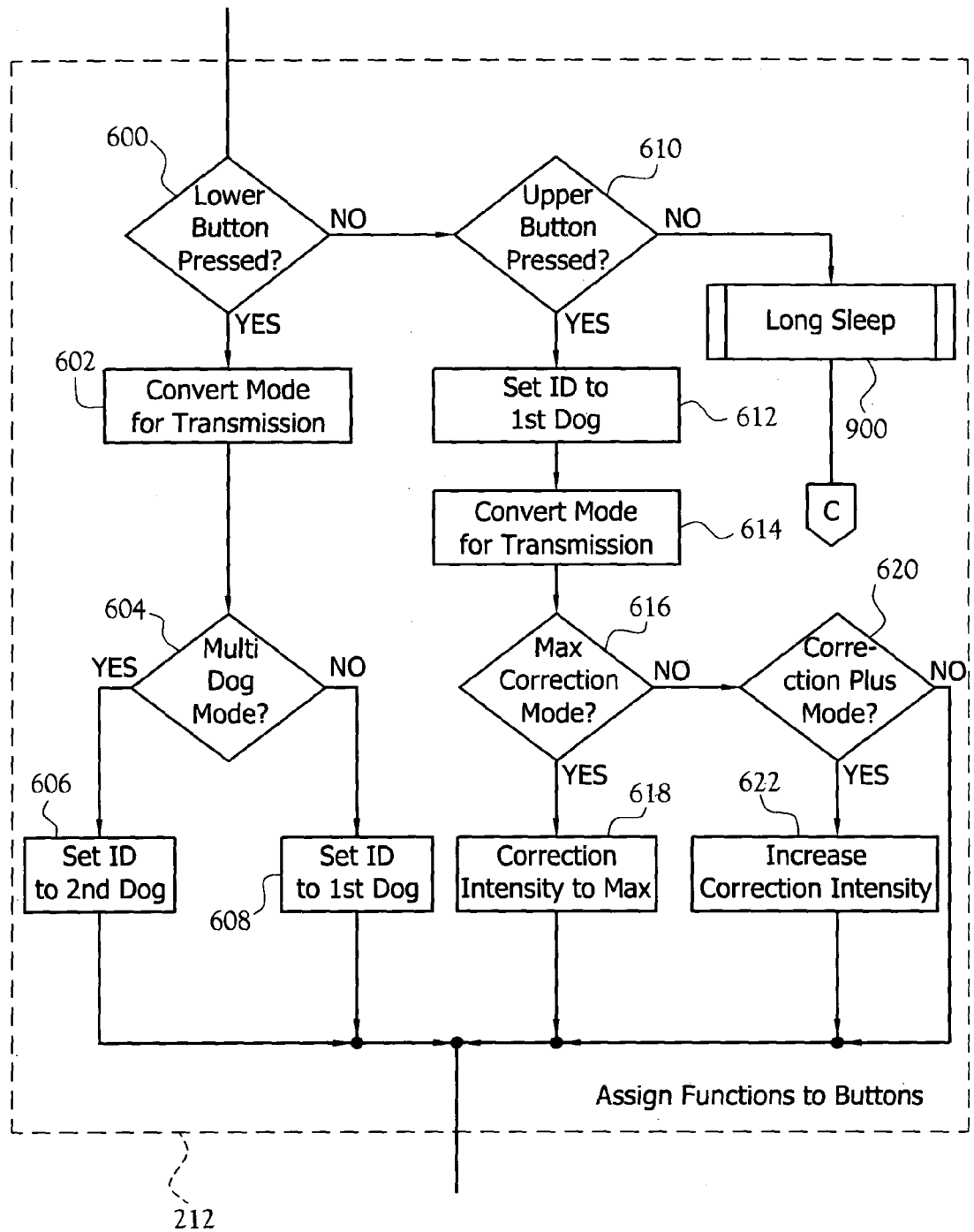
FIG. 6 is a flow diagram illustrating one embodiment of the button assignment function of the multi-function transmitter.

FIG. 6 illustrates the button function assignment 212 in greater detail. The multi-function transmitter 10 determines if the lower control button 122 is active 600. If the lower control button 122 is active, the current mode number is converted to a value for inclusion in the transmission signal 602. Next, the current mode value is checked to determine whether the multi-function transmitter 10 is operating in a multi-dog training mode 604. If the current mode is a multi-dog training mode, the activation of the lower control button 122 represents a training command sent to a second dog. Accordingly, the identification value for the training collar carried by the secondary dog is stored as the identification value for inclusion in the transmission data packet 606. If operating in a single dog training mode, the identification value for the training collar carried by the primary dog is stored as the identification value for inclusion in the transmission data packet 608. After the identification value associated with the lower control button 122 is determined, operation continues to the selected button processing function 214.

If the lower control button 122 is not active, the multi-function transmitter 10 determines if the upper control button 120 is active 610. If active, the identification value for the training collar carried by the primary dog is stored as the identification value for inclusion in the transmission data packet 612. The current mode number is converted to a value for inclusion in the transmission signal 614. Next, the multi-function transmitter 10 determines whether changes should be made to the correction intensity 616, 620. The multi-function transmitter 10 identifies whether the current mode is the maximum correction mode 616. If the maximum correction mode is selected, the correction intensity value is set to the maximum 618. If not the maximum correction mode, the multi-function transmitter 10 determines whether the increased correction intensity mode is selected 620. If the increased correction intensity mode is selected, the correction intensity value is increased 622. After any changes to the correction intensity have been made, operation continues to the selected button processing function 214. If neither of the upper control button 120 or the lower control button 122 is active, the multi-function transmitter 10 enters a long sleep cycle 900.

Figure 7:
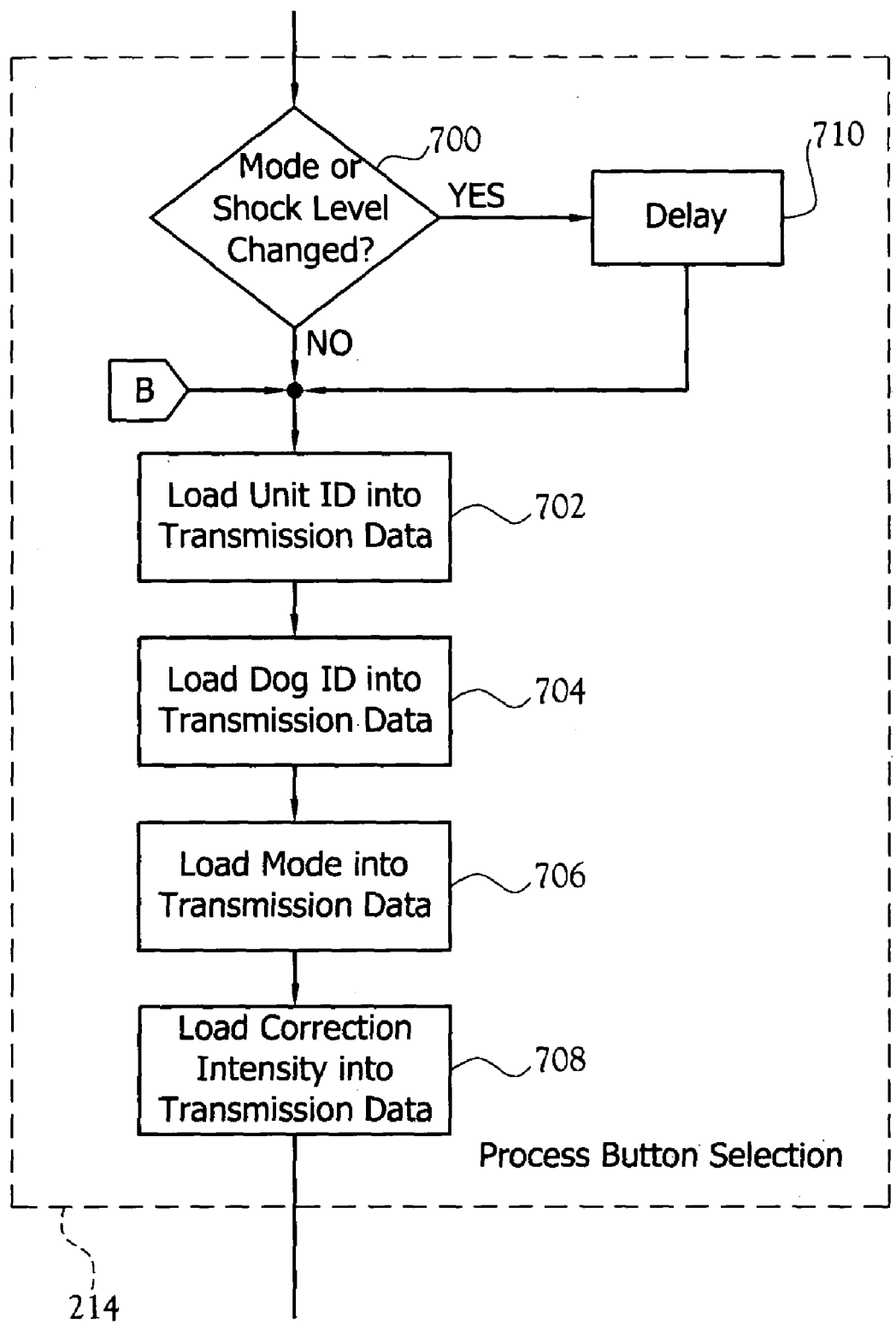
FIG. 7 is a flow diagram illustrating one embodiment of the selected button procession function of the multi-function transmitter.

FIG. 7 illustrates the selected button processing function 214 in greater detail. The multi-function transmitter 10 determines if the training mode or the correction intensity level has been modified 700. If a modification has occurred, a delay is introduced 710 The transmission data packet is built. The unit ID is added into the transmission data packet 702. The target identification value is loaded into the transmission data packet 704. The training mode value is loaded into the transmission data packet 706. The correction intensity value is loaded into the transmission data packet 708. Those skilled in the art will recognize that the order in which the transmission data packet is built can be varied without departing from the scope and spirit of the present invention. Once the transmission data packet is built, operation continues to the training signal transmission function 216.

Figure 8:
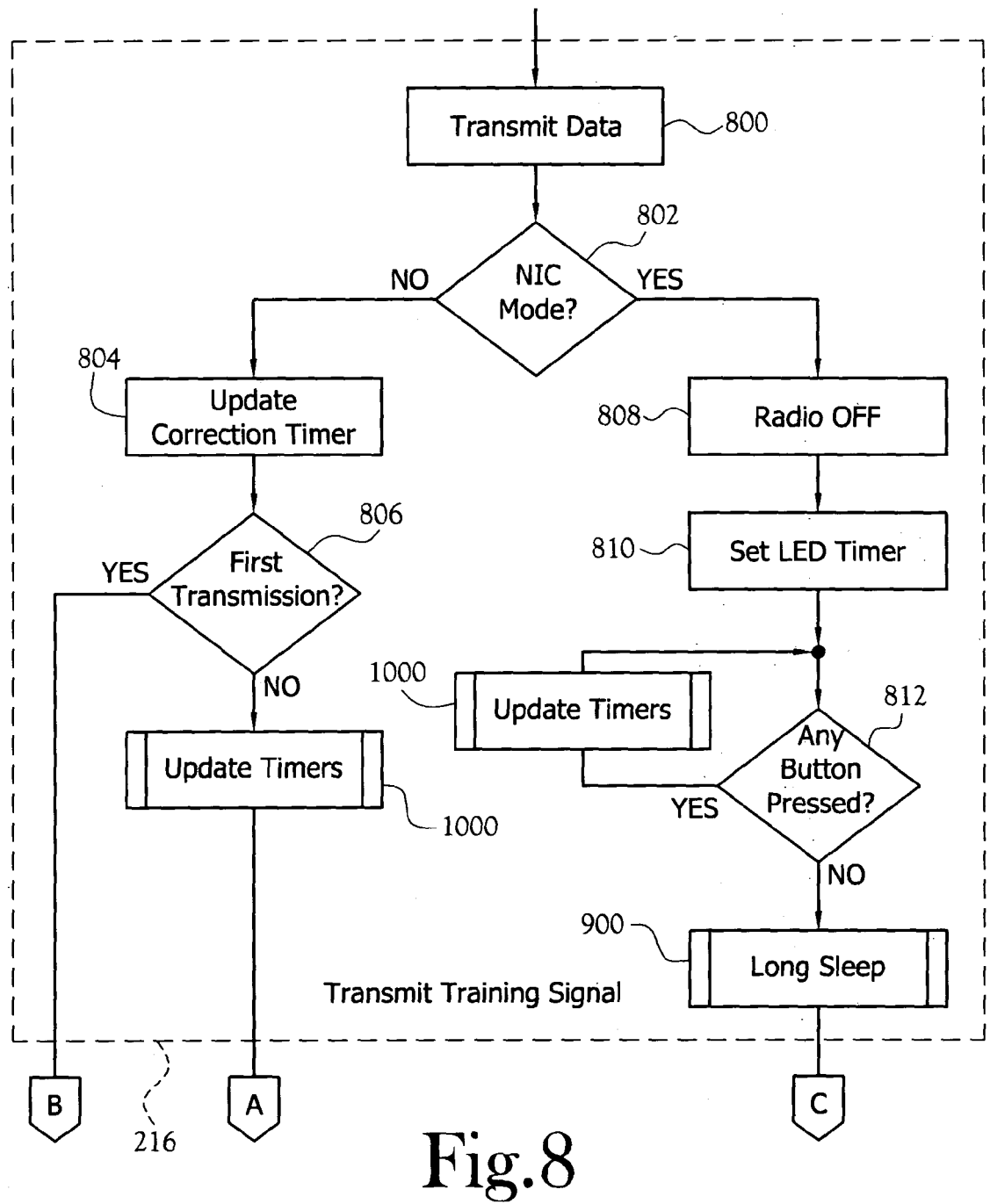
FIG. 8 is a flow diagram illustrating one embodiment of the training signal transmission function of the multi-function transmitter.

FIG. 8 illustrates the training signal transmission function 216 in greater detail. First, the transmission data packet is broadcast 800. The multi-function transmitter 10 determines whether the current training mode is a NIC correction mode 802. If not a NIC correction mode, the overcorrection timer is updated 804. The multi-function transmitter 10 then determines whether the transmission is the initial transmission for a particular training signal. If the transmission is not the first transmission, the timer update function is applied 1000. Following the timer update function 1000 or, if the transmission was the first transmission, operation returns to the training mode initialization function 210. When the training mode is a NIC correction mode, the communication subsystem 108 is temporary deactivated to prevent further transmissions 808. The LED timer is initialized 810. The multi-function transmitter 10 monitors activity on the buttons 812. While any button is pressed, the update timers function is applied 1000. After all buttons are released, the long sleep function 900 is applied.

Figure 9:
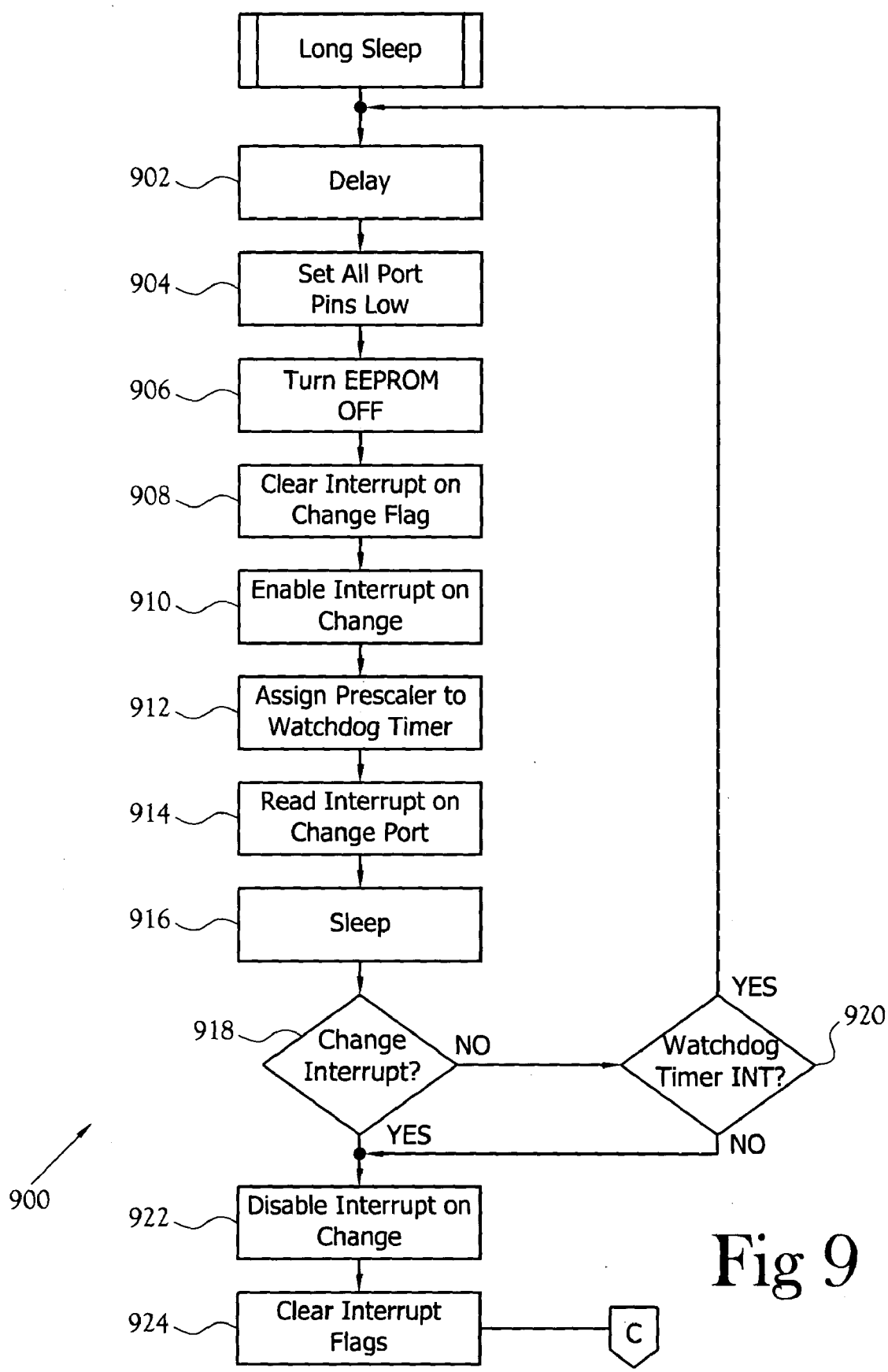
FIG. 9 is a flow diagram illustrating one embodiment of the power saving function of the multi-function transmitter.

FIG. 9 illustrates the long sleep function 900 in greater detail. The long sleep begins with a delay 902. Next all input port pins are set to a default value 904, for example, all port pins are set low. Next, the EEPROM is turned off 906. The interrupt flags are cleared 908 on the processing device 100 and then the interrupts are enabled 910. A prescaler is applied to watchdog timer 912 to adjust the length of time that the multi-function transmitter 10 operates before resetting. The change interrupt port is read 914. The multi-function transmitter 10 enters a sleep mode 916 for low current consumption when not in use. Next, the multi-function transmitter 10 determines whether a change has occurred on the interrupt port from the last reading of the interrupt port 918. This allows implementation of waking the multi-function transmitter 10 on key-depression. If no change has occurred, the multi-function transmitter 10 determines whether a watchdog timer interrupt has occurred 920. If a watchdog timer interrupt has not occurred or a change interrupt has occurred, the change interrupt is disabled 922 and the interrupt flags are cleared 924. However, if a watchdog timer interrupt occurs, the long sleep function 900 repeats.

Figure 10:
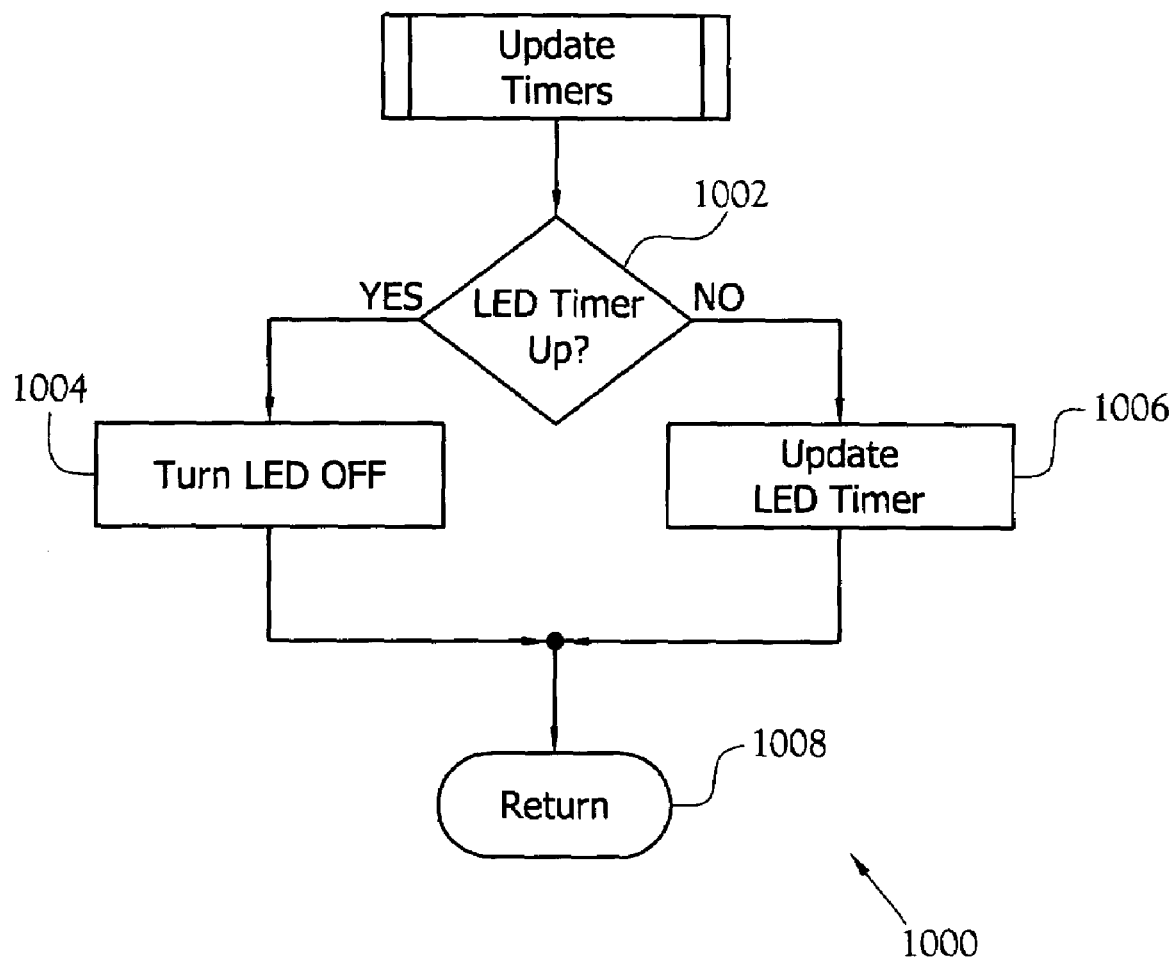
FIG. 10 is a flow diagram illustrating one embodiment of the timer update function of the multi-function transmitter.

FIG. 10 illustrates the update timers function 1000 in greater detail. The multi-function transmitter 10 determines whether the LED timer has expired 1002. When the LED timer expires, the operation indicator 130 is turned off 1004. If the LED timer has not expired, the LED timer is updated 1006.

Those skilled in the art will recognize that the flow diagram illustrated in FIGS. 2–11 represent one embodiment of the button function assignments that can be made using the present invention.

From the foregoing description, it will be recognized by those skilled in the art that a multi-function training transmitter has been provided that, in the foregoing embodiment, allows in-the-field modification of the training method without the changing of the transmitter and receiver pair. By being field reprogrammable, the multi-function trainer provides access to a variety of training methods from a single transmitter unit and can be programmed for use with one or more animals, depending upon the training session. Although described in reference to two animals, those skilled in the art will recognize that the transmitter is easily adaptable to handle any number of animals, the major limiting factors being the cost, size, and complexity of the transmitter layout. Such a layout might employ additional buttons for each additional animal or use a multi-function technique such as a shift button in the manner of the shift, CTRL, and ALT keys found on conventional keyboards.

While the present invention has been illustrated by description of several embodiments and while the illustrative embodiments have been described in detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

We claim:

1. A method for assigning functions to an animal training transmitter having a plurality of function selectors and a mode selector, said method comprising the steps of:
    (a) selecting a training mode via a mode selector;
    (b) assigning a function to each of a plurality of function selectors, said function associated with said training mode;
    (c) detecting an activation of one of said plurality of function selectors;
    (d) generating a data packet including a function corresponding to said activation of one of said plurality of function selectors; and
    (e) broadcasting said data packet.

2. The method of claim 1 further comprising the steps of:
    (f) selecting a correction stimulus intensity; and
    (g) including said correction stimulus intensity in said data packet.

3. The method of claim 1 further comprising the step of indicating said training mode to an operator.

4. An apparatus for training an animal, said apparatus comprising:
    means for selecting a training mode as a selected mode;
    means for assigning a function to each of a plurality of selectors based upon said selected mode;
    means for populating a data packet in response to activation of one of said plurality of selectors; and
    means for transmitting said data packet.

5. The apparatus of claim 4 further comprising means for providing indication of said selected mode to an operator.

6. An apparatus for training an animal, said apparatus comprising:
    a mode selector wherein activation of said mode selector selects a training mode stored as a selected mode;
    a plurality of function selectors;
    a processing device in communication with said mode selector and said plurality of function selectors, said processing device assigning a function to each of said plurality of function selectors in response to said selected mode, said processing device producing a signal in response to activation of one of said plurality of function selectors; and
    a transmitter in communication with said processing device, said transmitter broadcasting said training signal.

7. The apparatus of claim 6 further comprising an indicator in communication with said processing device, said indicator providing an indication of said selected mode.

8. An apparatus for training an animal, said apparatus comprising:
    a mode selector wherein activation of said mode selector selects a training mode stored as a selected mode;
    a plurality of function selectors;
    a processing device in communication with said mode selector and said plurality of function selectors, wherein one of said plurality of selectors is activated as an activated selector, said processing device producing a data packet in response to activation of one of said plurality of function selectors, said data packet including function information associated with said activated selector corresponding to said selected mode; and
    a transmitter in communication with said processing device, said transmitter broadcasting said data packet.

9. The apparatus of claim 8 further comprising an indicator in communication with said processing device, said indicator providing an indication of said selected mode.

10. A method for providing an animal training transmitter having a plurality of function selectors and a mode selector with user programmable features, said method comprising the steps of:
    (a) selecting a training mode via a mode selector;
    (b) activating one of a plurality of function selectors;
    (c) populating a data packet with a function code associated with said training mode in response to said step of activating one of a plurality of function selectors; and
    (d) broadcasting said data packet.

11. The method of claim 10 further comprising the steps of:
    (f) selecting a correction stimulus intensity; and
    (g) including said correction stimulus intensity in said data packet.

12. The method of claim 10 further comprising the steps of indicating said training mode to an operator.

* * * * *